United States Patent
Boisseau et al.

(10) Patent No.: US 6,554,321 B1
(45) Date of Patent: Apr. 29, 2003

(54) DECOUPLING SLEEVE FOR MOUNTING IN A MOTOR VEHICLE EXAUST PIPE

(75) Inventors: Vincent Boisseau, Cellule (FR); Jean-Michel Simon, Chatillon (FR); Marc Dolez, Olivet (FR); Daniel Mahin, Savonnieres (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 09/614,498

(22) Filed: Jul. 11, 2000

(30) Foreign Application Priority Data

Jul. 12, 1999 (FR) .............................................. 99 09889

(51) Int. Cl.[7] .............................................. F16L 11/14
(52) U.S. Cl. ......................................... 285/49; 285/226
(58) Field of Search .......................... 285/49, 299, 300, 285/302, 226, 298

(56) References Cited

U.S. PATENT DOCUMENTS

| | | | | |
|---|---|---|---|---|
| 2,666,657 A | * | 1/1954 | Howard et al. ................. | 285/49 |
| 3,105,708 A | * | 10/1963 | Esty ............................... | 285/41 |
| 3,232,640 A | * | 2/1966 | Donkle .......................... | 285/93 |
| 3,420,553 A | * | 1/1969 | Poxon et al. .................... | 285/49 |
| 3,532,131 A | * | 10/1970 | Lefere ........................... | 138/114 |
| 3,623,339 A | * | 11/1971 | Muller .......................... | 464/79 |
| 3,747,367 A | * | 7/1973 | Muller .......................... | 464/79 |
| 4,162,801 A | * | 7/1979 | Kresky et al. ................. | 285/45 |
| 4,183,557 A | | 1/1980 | Hinden | |
| 4,405,160 A | * | 9/1983 | Tyuuman ....................... | 285/39 |
| 5,346,263 A | * | 9/1994 | Huzenlaub et al. ............ | 285/53 |
| 5,437,479 A | | 8/1995 | Hartling et al. | |
| 5,813,704 A | * | 9/1998 | Naito ............................. | 285/226 |
| 5,882,046 A | * | 3/1999 | Thomas ......................... | 285/226 |
| 6,047,993 A | * | 4/2000 | Jungbauer ...................... | 285/49 |
| 6,062,268 A | * | 5/2000 | Elsasser et al. ............... | 138/121 |
| 6,151,893 A | * | 11/2000 | Watanabe et al. ............. | 285/299 |
| 6,296,282 B1 | * | 10/2001 | Burkhardt et al. ............. | 285/49 |

FOREIGN PATENT DOCUMENTS

| | | | |
|---|---|---|---|
| DE | 003146305 | * | 5/1983 |
| DE | 36 00 028 | | 1/1987 |
| EP | 0 327 148 | | 8/1989 |
| EP | 000568835 | * | 11/1993 |
| FR | 2 758 588 | | 7/1998 |
| JP | 08 326531 | | 12/1996 |

* cited by examiner

*Primary Examiner*—Brian L. Johnson
*Assistant Examiner*—Christopher Bottorff
(74) *Attorney, Agent, or Firm*—Alston & Bird LLP

(57) ABSTRACT

A decoupling sleeve for mounting in a motor vehicle exhaust pipe (LE), the sleeve (5) comprising in particular a mechanical portion (10) having two rigid end zones (15) for connection to the exhaust pipe (LE), and a sealing portion (11) that is thermally insulated from the inside by an insulation portion (12) and that extends over substantially the entire length of the mechanical portion (10) of the sleeve, the sleeve being characterized in that the sealing portion (11) comprises a central zone (22) formed by a layer or wall (24) made of a material that is flexible and that withstands temperature, and two rigid end zones (23) respectively connected to two end zones (15) of the mechanical portion (10), the sealing portion (11) forming a covering that is continuous, closed, and leakproof.

36 Claims, 2 Drawing Sheets

DECOUPLING SLEEVE FOR MOUNTING IN A MOTOR VEHICLE EXAUST PIPE

FIELD AND BACKGROUND OF THE INVENTION

The invention relates to a decoupling sleeve for mounting in a motor vehicle exhaust pipe.

In general, a motor vehicle engine exhaust pipe is connected to the outlet of the exhaust manifold of the engine. This pipe generally comprises one or more cylindrical units (catalytic converter, expander, muffler) constituting a number of masses along a pipe proper itself made up of one or more rigidly interconnected segments. The assembly is suspended from the bodywork of the vehicle via moderately flexible links formed by suspension points or straps generally based on elastomer, and it must accommodate movements of the engine associated with vertical accelerations, with sudden changes of speed, with thermal expansion, with assembly tolerances, . . . .

That is why an exhaust pipe usually includes a flexible tubular coupling referred to as a "decoupling sleeve" which serves to avoid the exhaust pipe being damaged or destroyed by the various constraints mentioned above. The sleeve makes it possible to obtain the flexibility that is required for decoupling engine vibration from the exhaust pipe and from the bodywork, and it improves comfort in the cabin of the vehicle.

As a general rule, the sleeve must withstand a flow of hot gas whose temperature can reach or even exceed 900° C. on a continuous basis and it must also withstand the external conditions to which the exhaust pipe is subjected. However, the sleeve must not interfere with the operation of various elements in the exhaust pipe, and in particular, for gasoline engines, it must not allow any air to enter the catalytic converter.

Sleeves are known that are constituted by tubes of 0.3 mm to 0.5 mm thick stainless sheet metal, the sheet metal being corrugated to form a bellows having an internal lining and an external braid or knit. However, such sleeves are stiff and they have modes of vibration that are well-marked and noisy. Furthermore, they can withstand no tension, no twisting, and no deformation in bending, in shear, or in compression in excess of acceptable levels.

In general, the degree of sealing required upstream from the catalytic converter makes it necessary to use a covering that is closed completely and in leakproof manner since otherwise it would be necessary for the elements of a discontinuous structure to be clamped together extremely tightly, which state of affairs is difficult to maintain under all deformations of the sleeve. In addition, deformations of the sleeve give rise to folding and to folds that crisscross, and the continuous tube or sheet elements must be extensible since otherwise they risk mechanical destruction.

Unfortunately, flexible materials capable of providing the required degree of sealing, e.g. elastomers, are of limited temperature capability. It is therefore necessary to have a high temperature elastomer of silicone or analogous type, together with thermal protection.

Difficulties with thermal insulation are then made worse by constraints associated with space availability, since the inside diameter of the sleeve cannot be made smaller without greatly impeding the flow of gases, while its outside diameter is constrained by the very limited amount of space available for the exhaust pipe. Furthermore, conduction through the couplings causes the leakproof junction between them and the elastomer covering to be the hottest region of the covering. Finally, ordinary refractory felts have thermal conductivity that increases greatly at high temperature.

In document FR-A-2 676 502, the decoupling sleeve is made of a silicone type high temperature elastomer material which is protected internally by refractory and fibrous insulating materials. The need for providing at least a minimum level of bending strength requires the silicone to be very thick (about 7 mm thick) which considerably degrades effects relating to thermal protection and to the flexibility that can be expected in compression.

In document EP-A-0 145 020, the decoupling sleeve has a cylindrical metal framework which serves as a support for a set of superposed layers, in particular an inner fabric layer based on inorganic fibers, a sealing layer constituted by a metal foil, a thermal insulation layer, and an outer protective layer. At each end of the sleeve, the set of layers is pinched together by means of stitches made with wire.

In document FR-A-2 758 588, the decoupling sleeve is constituted by a functional stack of materials preferably shaped to form a bellows and comprising an inner layer, a barrier layer, a thermal insulation layer, and a leakproof outer layer made of elastomer, the stack being held between two interleaved helical springs, one on the inside and the other on the outside.

At each of their ends, the two springs present touching turns to constitute rigid surfaces. These surfaces which extend over a length of not less than 1 cm are used to enable the sleeve to be connected to the ends of two pipe segments of the exhaust pipe between which the sleeve is interposed. Such connections can be made by means of rigid collars or by crimping, for example.

However, to obtain good sealing and good mechanical strength simultaneously, all of the layers beneath the elastomer, including the insulation which is already rather thin given the space available, are highly compressed by the crimping and thus lose their effectiveness. In the absence of a sealing gasket, clamping does not provide sufficient sealing for an application to engines having catalytic converters, for example.

The proximity of the connection to the pipe proper, which is generally thin and made of metal, worsens the heating of the elastomer in this zone because of conduction, in particular when continuity is established for sealing purposes.

Given the structure of the prior art decoupling sleeves mentioned above, and the various constraints they are called on to withstand, an object of the invention is to design a decoupling sleeve which does not present the drawbacks of the prior art and which is capable of complying as well as possible the conditions it needs to satisfy in order to mitigate the effects of the constraints inherent to the operating conditions of an exhaust pipe.

In other words, an object of the invention is to design a flexible decoupling sleeve which is capable of withstanding a flow of gas at high temperature, and which is intended more particularly for providing mechanical and vibrational decoupling in an exhaust pipe.

SUMMARY OF THE INVENTION

To this end, the invention provides a decoupling sleeve for mounting in a motor vehicle exhaust pipe, the sleeve comprising in particular a mechanical portion having two rigid end zones for connection to the exhaust pipe, and a sealing portion that is thermally insulated from the inside by an insulation portion and that extends over substantially the entire length of the mechanical portion of the sleeve, the sleeve being characterized in that the sealing portion comprises a central zone formed by a layer or wall made of a material that is flexible and that withstands temperature, and two rigid end zones respectively connected to two end zones of the mechanical portion, the sealing portion forming a covering that is continuous, closed, and leakproof.

According to another characteristic of the invention, the mechanical and sealing portions are dissociated from each other so as to perform their respective functions independently of each other.

The flexible layer or wall of the sealing portion of the sleeve is made of an elastomer material such as silicone which is thermally protected radially by the insulation portion and axially by the two end portions of the sealing portion.

The two end portions of the sealing portion are constituted by two long thin covers, preferably made of a material that conducts heat poorly, such as stainless steel for example, said covers serving to reduce heat conduction towards the flexible layer and also to contribute to making the sealing portion in the form of a continuous covering that is closed and leakproof.

In an embodiment of the sealing portion:

the thickness of the flexible wall is about 0.5 mm to 3 mm, and the wall is folded and reinforced by flexible turns, e.g. to provide better mechanical strength against the pressure of a gas flow; and each cover is relatively long and thin, possibly also having fins, folds, or conductive extensions to provide a greater area for evacuating heat, while the thinness and the poor conductivity of the covers limit heat conduction from the two hot zones where the sleeve is connected to the exhaust pipe.

In general, the radial insulation portion of the flexible wall of the sealing portion extends beneath the covers to insulate them, and it is made of an insulating material having a thickness of about 5 mm to 20 mm.

The mechanical portion of the sleeve can be made with various structures, some of which are described below, it being understood that this mechanical portion does not in itself constitute an essential characteristic of the invention.

In an important advantage of the invention, the fact of connecting the decoupling sleeve to the exhaust pipe via the mechanical portion of the sleeve serves to prevent the thermal insulation and sealing portions being crushed and also serves to limit the amount of heat that is transferred to these portions

BRIEF DESCRIPTION OF THE DRAWINGS

Other advantages, characteristics, and details of the invention will appear on reading the additional description below made with reference to the accompanying drawings, given purely by way of example, and in which.

DESCRIPTION OF ILLUSTRATED EMBODIMENTS

Figure 1:
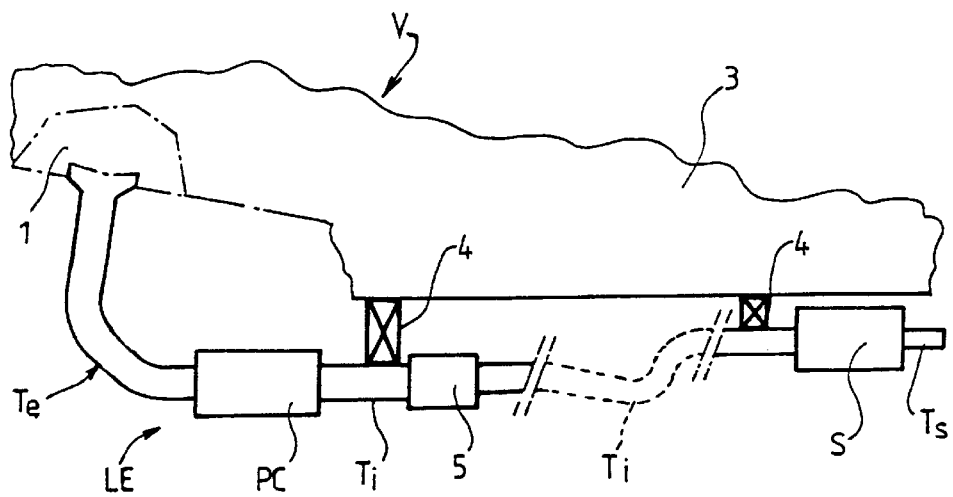
FIG. 1 is a diagrammatic view of a conventional motor vehicle engine exhaust pipe which includes a decoupling sleeve.

In general and as shown in FIG. 1, an exhaust pipe LE for the engine of a motor vehicle V is mounted to the outlet of the exhaust manifold 1 of the engine.

By way of example, the exhaust pipe LE comprises an upstream or inlet pipe segment Te, a catalytic converter PC, one or more intermediate pipe segments Ti, a muffler S, and a downstream or outlet pipe segment Ts. The various component elements of the exhaust pipe LE are made of metal and are interconnected by metal half-collars (not shown). The exhaust pipe LE is suspended from the bodywork 3 of the vehicle V by means 4 such as suspension points or straps made of elastomer.

At present, the structure of this type of exhaust pipe LE also includes a decoupling sleeve 5 for the reasons mentioned in the introduction.

A decoupling sleeve 5 of the invention is a tubular structure of axis X—X which comprises in particular at least one mechanical portion 10 for connection to two adjacent pipe segments of the exhaust pipe LE, and a sealing portion 11 which extends over substantially the entire length of the mechanical portion 10 and which is also thermally insulated on the inside by an insulation portion 12.

Figure 2:
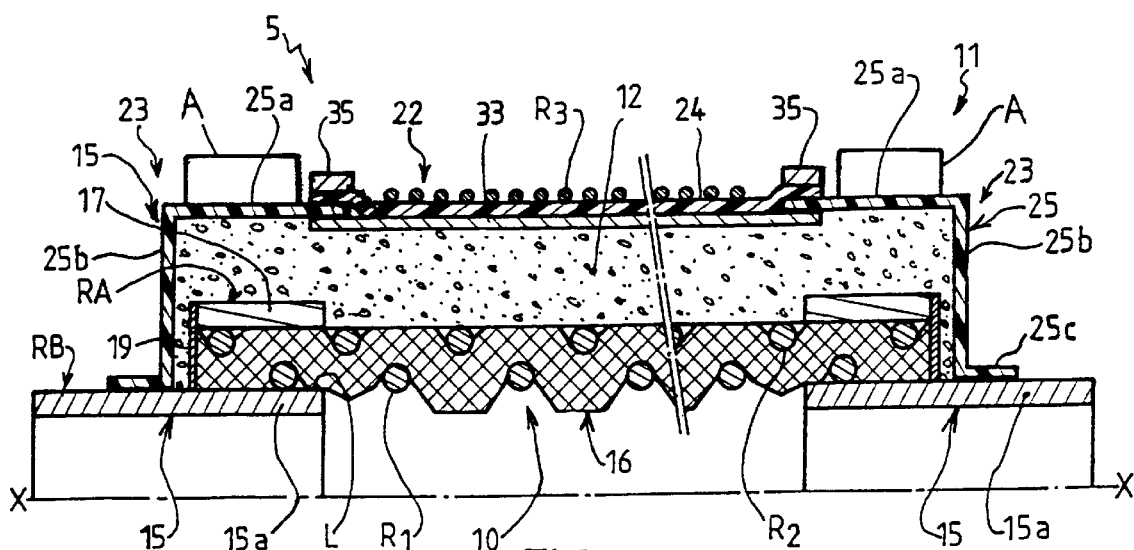
FIG. 2 is a half-view in longitudinal section through a first embodiment of a decoupling sleeve of the invention.

In a first embodiment as shown in FIG. 2, the mechanical portion 10 comprises, in the axial direction, two rigid and continuous end zones 15 in the form of two metal tubular coupling endpieces 15a, e.g. made of stainless steel, which endpieces are connected to each other by a flexible mechanical link 16 capable of accommodating angular deflections.

The flexible link 16 of the mechanical portion 10 forms an inner cylindrical covering which comes into contact with exhaust gases and which is made of a material which must be mechanically strong which must withstand high temperatures. In this first embodiment, the flexible link 16 is made of stainless steel wires or fibers in the form of a fabric, a braid, a knit, . . . , it being understood that it is preferable to use an oriented structure of long fibers that hold on to one another. By way of example, a woven fabric of stainless steel fibers oriented at 45° and forming a pad that is thin, dense, and strong can be suitable.

Advantageously, the flexible link 16 is given a bellows shape by being held captive between two interleaved springs R1 and R2. The bellows is of amplitude and pitch that are small and short, being selected in proportion to the thickness of the bellows. For example, the flexible link 16 can have an inside diameter of about 40 mm to 60 mm, a thickness of about 5 mm to 10 mm, and it can extend over a length of about 40 mm to 100 mm, while the springs R1 and R2 can be made of stainless steel wire of diameter of about 1 mm to 3 mm and mounted to have a pitch of about 5 mm to 20 mm.

In this first embodiment given by way of example, each connection endpiece 15a comprises an annular portion forming a connection RA with the flexible link 16 of the mechanical portion 10, and a tubular portion forming a coupling RB with a segment of the exhaust pipe LE.

More precisely, the connection RA comprises an annular housing L1 defined by a wall formed by an end portion of the endpiece 15a and an outer cylindrical wall 17 that is coaxial about the endpiece 15a, and by an annular transverse wall 19 forming the end wall of the housing L. The outer wall 17 of the housing L is spaced from the endpiece 15a by a distance that corresponds substantially to the thickness of the flexible link 16 of the mechanical portion 10. The housing L extends over a length of about 20 mm to 50 mm so as to receive an end portion of the flexible link 16 over this length. The connection RA and the flexible link 16 are fixed together by crimping, for example, the outer cylindrical wall 17 acting as a crimping tube which is integral with the endpiece 15a.

In a variant, the outer cylindrical wall 17 of the housing L could be dissociated from each of the connection endpieces 15a so as to form an independent crimping tube which is put into place prior to crimping on each end portion of the flexible link 16 of the mechanical portion 10.

The connection RB of each endpiece 15a is formed by the other end portion of the endpiece 15a and its diameter can be adapted, where necessary, to the diameter of the segment of the exhaust pipe LE to which it is connected by crimping, welding, or the like.

Thus, in the invention, the decoupling sleeve 5 is fixed to the exhaust pipe LE via its mechanical portion 10, and this is performed independently of the way in which the sealing portion 11 and the thermal insulation portion 12 are assembled together so that only the mechanical portion 10 serves to transmit the forces to which the exhaust pipe LE is subjected.

The sealing portion 11 of the sleeve 5 has a flexible central zone 22 and two rigid end zones 23, this assembly being designed to form a continuous covering which is closed and leakproof and which surrounds the sleeve.

By way of example, the flexible central zone 22 is constituted by at least one layer or wall 24 of an elastomer material such as silicone, and it is relatively thin, being about 0.5 mm to 2 mm thick. This wall 24 can be reinforced by a perforated structure of the knit type that is advantageously thermally conductive, and that can be made out of glass.

The flexible wall 24 is advantageously reinforced by a mechanical reinforcing element to provide better strength against the pressure of the flow of gas. This reinforcement can consist in giving a folded structure to the flexible wall 24 due to the presence of ribs in relief or to added elements such as a lightweight spring R3 having a pitch that is short so that the folds are small in amplitude. This spring R3 can be constituted by a stainless steel wire having a diameter of about 0.5 mm to 1 mm and mounted with a pitch of about 4 mm to 10 mm around the flexible central zone 22.

Each end zone 23 of the sealing portion 11 is constituted by a cover 25 which is as long and as thin as possible, and made of a rigid material, if possible a material that is a poor conductor of heat, but above all a material that is compatible with the thermal and mechanical expansions and environment. Each cover 25 is preferably is made of a material which has substantially the same coefficient of thermal expansion as the tubular endpiece 15a on which it is fixed, e.g. made of stainless steel, and it can be corrugated or highly folded in shape.

The function of the covers 25, in addition to co-operating with the flexible layer 24 to form a leakproof covering, is to provide axial insulation for the purpose of limiting the temperature of the layer 24, and thus limiting degradation thereof.

In an embodiment, each cover 25 is constituted by a cylindrical wall 27 which is partially closed at one end by an annular transverse wall 29.

The sealing portion 11 is thermally insulated from the inside, i.e. radially, by the insulation portion 12 which forms a tubular element that extends at least over the entire length of the sealing portion 11. By way of example, this element is constituted by a mat comprising a sufficient thickness of long refractory fibers, fibrous elements in the form of sheets or flakes of mica or of stainless steel, for example, or powder such as a nanometric silica that can be packaged in a vacuum, and the thickness of the mat is about 5 mm to 20 mm.

The insulation portion 12 extends over a length that is longer than that of the flexible link 16 of the mechanical portion 10, so as to surround not only said flexible link 16, but also the connections RA of the connection endpieces 15a.

The two covers 25 surround the thermal insulation portion 24 entirely. Advantageously, the two covers 25 are engaged on respective ones of the connections RB of the two connection endpieces 15a so as to cover the connections RA which support the flexible link 16 of the mechanical portion 10 of the sleeve 5. The thermal insulation portion 12 which extends beyond the flexible link 16 of the mechanical portion 10 thus comes into contact with the end wall of each cover 25.

Finally, each assembly cover 25 is fixed to the connection RB of the associated connection endpiece 15a by welding, for example. Advantageously, each assembly cover 25 extends axially from its annular wall 29 forming the end wall of the cover in the form of a tubular portion 31 having an inside diameter that is very slightly greater than the outside diameter of the connection RB of the associated connection endpiece 15 so as to make it easier to mount and fix on said endpiece 15.

The flexible central zone 22 of the sealing portion 11 can also include a thermally conductive and deformable element 33 which is interposed between the thermal insulation portion 12 and the flexible wall 24 or which surrounds it. By way of example, this element 33 can be a layer of aluminum that is about 0.5 mm thick, and that penetrates into the inside of each cover 25 while the flexible wall 24 overlies the covers 25 in part so as to be fixed thereto by means of clamping collars 35, for example. This element 33 could equally well be made in the form of a knit.

Advantageously, the covers 25 present the largest possible surface area for evacuating heat. To this end, they can be provided with cooling fins A, with thermally-conductive extensions or folds, and/or with insulating spacers between the covers 25 and the flexible wall 22 so as to limit the flow of heat coming from the hot zones which are situated at the two ends of the sleeve.

By way of example:
the outside diameter of the flexible wall 24 is about 0.5 to 2 or 3 times the outside diameter of the exhaust pipe segment, about 0.5 mm to 3 mm thick, is folded at a pitch that is about 3 to 10 times its thickness and with an amplitude that is about 0.3 to 5 times the pitch, and is about 30 mm to 100 mm long, i.e. 0.5 to 1.5 times its own outside diameter; and
the covers 25 are made of refractory stainless steel, being about 0.2 mm to 1 mm thick, and of sufficient length to give rise to a sufficient temperature drop at the flexible wall 24, which length is about 0.5 to 2 or 3 times the outside diameter of the pipe segment, i.e. about 40 mm to 100 mm.

Figure 3:
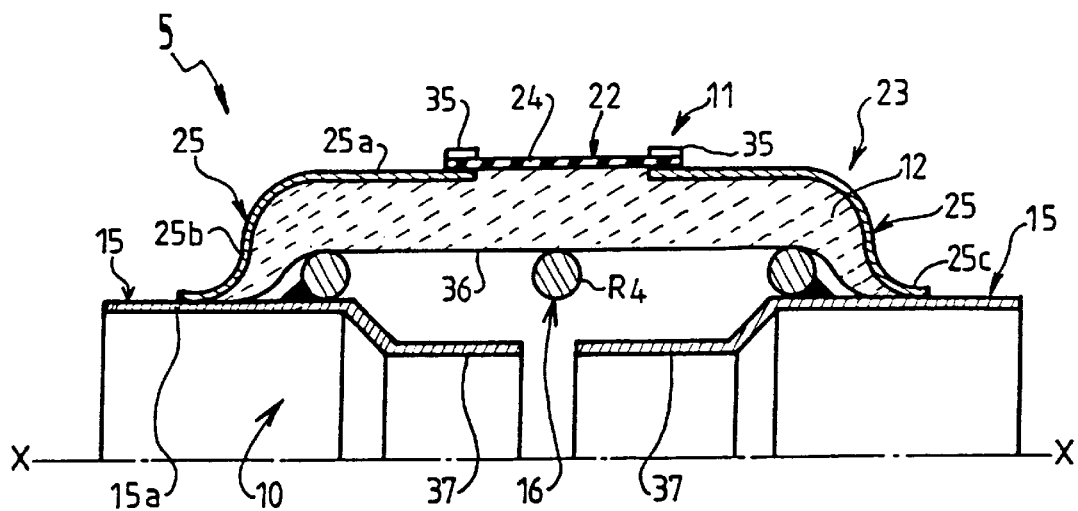
FIGS. 3 and 4 are two half-views in section of two other embodiments of a decoupling sleeve of the invention.

In a second embodiment shown in FIG. 3, the flexible link 16 which interconnects the two connection endpieces 15a of the mechanical portion 10 of the sleeve is constituted by a spring R4 of metal wire which is about 5 mm to 14 mm thick, and which serves essentially to contribute to transmitting any forces.

The sealing portion 11 of the sleeve 5 then also comprises an inner covering 36 in the form of a thin foil of stainless steel which is interposed between the spring R4 and the thermal insulation portion 12.

Each connection endpiece 15a can be a simple tubular element to which the respective ends of the spring R4 are welded so as to provide mechanical continuity.

Advantageously, each connection endpiece 15a can be extended axially inside the sleeve by a respective tubular element 37 that is in axial alignment therewith and that forms a deflector.

In a variant, the deflector can be constituted by a single tubular element extending that one of the connection endpieces 15a that is located upstream relative to the flow direction of the exhaust gases.

Figure 4:
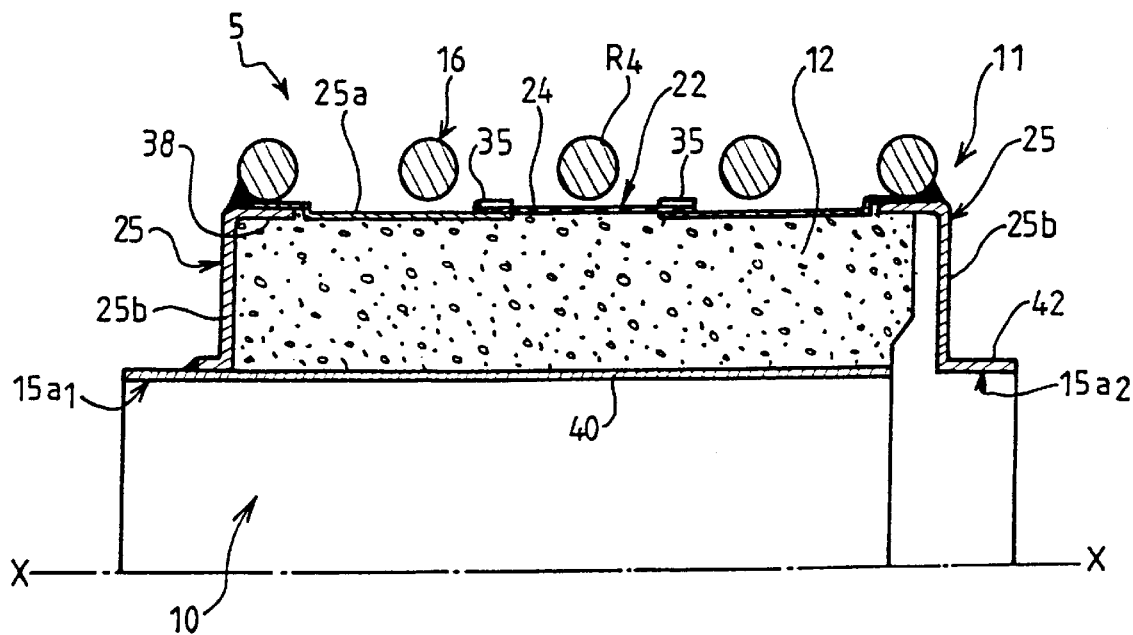

In a third embodiment as shown in FIG. 4, the flexible link 16 of the mechanical portion 10 of the sleeve 5 is likewise constituted by a spring R4 of the same type as that shown in FIG. 3, but which is mounted on the outside of the sealing portion 11 so as to surround both it and the insulation portion 12 associated therewith.

The axial and transverse portions 25a and 25b of each cover 25 can form two elements that are fixed to each other by welding, the transverse portion 25b being thicker than the axial portion 25a. Each end of the spring R4 is welded to a rim 38 of the transverse portion 25b of each cover 25.

The sealing portion 11 further comprises a thin inner covering 40 of stainless steel which comes into contact with the exhaust gases. This covering 40 is thus surrounded by the insulation portion 12. One axial end of the covering 40 is welded to a rigid connection endpiece 15a, of the mechanical portion 10 or can be integral with said endpiece $15a_1$ while being of smaller thickness, since it is not required to transmit forces. However, the other axial end of the covering 40 is free and is not connected to the other connection endpiece $15a_2$ which can advantageously be formed by a rim 42 on the transverse annular portion 25b of the associated cover.

In this third embodiment, the transverse portion 25b of each cover 25 forms a portion of the mechanical portion 10 of the sleeve 5 for providing mechanical continuity between the connection endpieces $15a_1$, $15a_2$ and the spring R4, which is why it is thicker than the axial portion 25a.

The sleeve of this third embodiment is somewhat asymmetrical compared with the two embodiments described above. Naturally, the sealing portion 11 of the sleeve 5 in FIGS. 3 and 4 can have the same characteristics as those described and shown in FIG. 2, in particular concerning the structure of the flexible central link 22.

What is claimed is:

1. A decoupling sleeve for mounting in a motor vehicle exhaust pipe, the sleeve comprising a mechanical portion having two rigid end zones for connection to the exhaust pipe and a flexible mechanical link extending between and interconnecting said rigid end zones, a sealing portion including a central zone formed by a layer or wall made of a material that is flexible and that withstands temperature and two rigid end zones in the form of covers respectively connected to said two end zones of the mechanical portions and an insulation portion between said central zone and said mechanical portion that extends over substantially the entire length of the mechanical portion of the sleeve and beyond the flexible link and into contact with the covers to thereby thermally insulate the central zone from the inside, the sealing portion forming a covering that is continuous, closed, and leakproof.

2. A decoupling sleeve according to claim 1, wherein the mechanical and sealing portions are dissociated from each other so as to perform their respective functions independently of each other.

3. A decoupling sleeve according to claim 1 wherein the flexible layer of the central zone of the sealing portion is about 0.5 mm to 2 mm thick.

4. A decoupling sleeve according to claim 1, wherein the flexible layer of the central zone of the sealing portion is made of an elastomer material.

5. A decoupling sleeve according to claim 1, wherein the flexible layer of the central zone of the sealing portion is reinforced by a perforated structure of the knit type.

6. A decoupling sleeve according claim 5, wherein the reinforcement of the layer is made of a material that conducts heat.

7. A decoupling sleeve according to claim 1, wherein the flexible layer of the central zone of the sealing portion is lightly folded.

8. A decoupling sleeve according to claim 7, including a spring which surrounds the flexible layer to give it a folded shape.

9. A decoupling sleeve according to claim 1, wherein the flexible wall has an outside diameter that is about 0.2 to 3 times the outside diameter of the exhaust pipe segment and a length that is about 0.5 to 1.5 times its own outside diameter.

10. A decoupling sleeve according to claim 1, wherein each end zone of the sealing portion is made in the form of a long and thin cover.

11. A decoupling sleeve according to claim 10, wherein each cover has an axial length that is about 0.5 to 2 times the outside diameter of the exhaust pipe segment.

12. A coupling sleeve according to claim 1, wherein the end zones of the mechanical portion of the sleeve comprise two metal tubular endpieces which are united with each other by a flexible central link that enables the sleeve to be deformed angularly.

13. A decoupling sleeve according to claim 12, wherein the sealing portion extends axially beyond the flexible central link.

14. A decoupling sleeve according to claim 12 wherein the flexible link of the mechanical portion of the sleeve includes fabric made of stainless steel wires or fibers to form a mat that is thin, dense, and strong, having a thickness of about 5 mm to 10 mm.

15. A decoupling sleeve according to claim 12 wherein the flexible link of the mechanical portion of the sleeve includes an oriented structure of long fibers.

16. A decoupling sleeve according to claim 12 wherein the flexible link of the mechanical portion of the sleeve is held captive between two interleaved springs to give it a bellows shape.

17. A decoupling sleeve according to claim 16, wherein the flexible link of the mechanical portion of the sleeve is constituted by a spring of a metal wire that is about 7 mm to 14 mm thick.

18. A decoupling sleeve according to claim 17, wherein the spring is situated on the inside of the sleeve and is surrounded by the thermal insulation portion.

19. A decoupling sleeve according to claim 18, wherein an inner covering in the form of thin stainless steel foil is interposed between the spring and the thermal insulation portion.

20. A decoupling sleeve according to claim 18 wherein the spring surrounds a tubular deflector which comes into contact with exhaust gases.

21. A decoupling sleeve according to claim 19, wherein the deflector is made up of two portions connected respectively to the two rigid end zones of the sleeve.

22. A decoupling sleeve according to claim 20 wherein the deflector comprises a single portion which is connected to one of the rigid end zones of the sleeve.

23. A decoupling sleeve according to claim 1, wherein the thermal insulation portion is made of an insulating material and has thickness of about 5 mm to 20 mm, extending over the entire length of the sealing portion of the sleeve.

24. A decoupling sleeve for mounting in a motor vehicle exhaust pipe, the sleeve comprising a mechanical portion having two rigid end zones for connection to the exhaust pipe and a flexible mechanical link extending between and interconnecting said rigid end zones, and a sealing portion that is thermally insulated from the inside by an insulation portion and that extends over substantially the entire length of the mechanical portion of the sleeve, wherein the sealing portion comprises a central zone formed by a layer or wall made of a material that is flexible and that withstands temperature, and two rigid end zones respectively connected to said two end zones of the mechanical portion, the sealing portion forming a covering that is continuous, closed, and leakproof, further including a deformable and thermally conductive element which surrounds the flexible layer internally or externally.

25. A decoupling sleeve for mounting in a motor vehicle exhaust pipe, the sleeve comprising a mechanical portion having two rigid end zones for connection to the exhaust pipe and a flexible mechanical link extending between and interconnecting said rigid end zones, and a sealing portion that is thermally insulated from the inside by an insulation portion and that extends over substantially the entire length of the mechanical portion of the sleeve, wherein the sealing portion comprises a central zone formed by a layer or wall made of a material that is flexible and that withstands temperature, and two rigid end zones respectively connected to said two end zones of the mechanical portion, the sealing portion forming a covering that is continuous, closed, and leakproof, wherein each end zone of the sealing portion is made in the form of a long and thin cover, and wherein each cover supports cooling fins.

26. A decoupling sleeve for mounting in a motor vehicle exhaust pipe, the sleeve comprising a mechanical portion having two rigid end zones for connection to the exhaust pipe and a flexible mechanical link extending between and interconnecting said rigid end zones, and a sealing portion that is thermally insulated from the inside by an insulation portion and that extends over substantially the entire length of the mechanical portion of the sleeve, wherein the sealing portion comprises a central zone formed by a layer or wall made of a material that is flexible and that withstands temperature, and two rigid end zones respectively connected to said two end zones of the mechanical portion, the sealing portion forming a covering that is continuous, closed, and leakproof, wherein each end zone of the sealing portion is made in the form of a long and thin cover, and wherein each cover is made of a material that is a poor conductor of heat.

27. A decoupling sleeve for mounting in a motor vehicle exhaust pipe, the sleeve comprising a mechanical portion having two rigid end zones for connection to the exhaust pipe and a flexible mechanical link extending between and interconnecting said rigid end zones; a sealing portion comprising a central zone made of a material that is flexible and that withstands temperature and two rigid end zones or covers respectively connected to said two end zones of the mechanical portion; wherein the mechanical and sealing portions are dissociated from each other so as to perform their respective functions independently of each other, the central zone is constituted by at least a thin layer of an elastomer material which is thermally protected radially by an insulation portion that extends over substantially the entire length of the mechanical portion of the sleeve, and which is also thermally protected axially by the covers which are relatively long and thin.

28. A decoupling sleeve according to claim 27, wherein the thin layer of the central zone of the sealing portion has a thickness of about 0.5 mm to 2 mm.

29. A decoupling sleeve according to claim 27, wherein the covers have a thickness of about 0.2 mm to 1 mm.

30. A decoupling sleeve according to claim 27, wherein the thermal insulation portion has a thickness of about 5 mm to 20 mm.

31. A decoupling sleeve for mounting in a motor vehicle exhaust pipe, the sleeve comprising a mechanical portion having two rigid end zones for connection to the exhaust pipe and a flexible mechanical link extending between and interconnecting said rigid end zones; a sealing portion comprising a central zone made of a material that is flexible and that withstands temperature and two rigid end zones or covers respectively connected to said two end zones of the mechanical portion; wherein the mechanical and sealing portions are dissociated from each other so as to perform their respective functions independently of each other, the central zone is constituted by at least a thin layer of an elastomer material having a thickness of about 0.5 mm to 2 mm and which is thermally protected radially by an insulation portion that extends over substantially the entire length of the mechanical portion of the sleeve; and which is also thermally protected axially by the covers which are relatively long and thin with a thickness of about 0.2 mm to 1 mm.

32. A decoupling sleeve according to claim 31, wherein the thermal insulation portion has a thickness of about 5 mm to 20 mm.

33. A decoupling sleeve for mounting in a motor vehicle exhaust pipe, the sleeve comprising a mechanical portion having two rigid end zones for connection to the exhaust pipe and a flexible mechanical link extending between and interconnecting said rigid end zones; a sealing portion comprising a central zone made of a material that is flexible and that withstands temperature and two rigid end zones or covers respectively connected to said two end zones of the mechanical portion; wherein the mechanical and sealing portions are dissociated from each other so as to perform their respective functions independently of each other, the central zone is constituted by at least a thin layer of an elastomer material having a thickness of about 0.5 mm to 2 mm and which is thermally protected radially by an insulation portion having a thickness of about 5 mm to 20 mm and extends over substantially the entire length of the mechanical portion of the sleeve, and which is also thermally protected axially by the covers which are relatively long and thin.

34. A decoupling sleeve according to claim 33, wherein the covers have a thickness of about 0.2 mm to 1 mm.

35. A decoupling sleeve for mounting in a motor vehicle exhaust pipe, the sleeve comprising a mechanical portion having two rigid end zones for connection to the exhaust pipe and a flexible mechanical link extending between and interconnecting said rigid end zones; a sealing portion comprising a central zone made of a material that is flexible and that withstands temperature and two rigid end zones or covers respectively connected to said two end zones of the mechanical portion; wherein the mechanical and sealing portions are dissociated from each other so as to perform their respective functions independently of each other, the central zone is constituted by at least a thin layer of an elastomer material having a thickness of about 0.5 mm to 2 mm and which is thermally protected radially by an insulation portion having a thickness of about 0.5 mm to 20 mm and that extends over substantially the entire length of the mechanical portion of the sleeve, and which is also thermally protected axially by the covers which are relatively long and thin.

36. A decoupling sleeve according to claim 35, wherein the covers have a thickness of about 0.2 mm to 1 mm.

* * * * *

UNITED STATES PATENT AND TRADEMARK OFFICE
CERTIFICATE OF CORRECTION

PATENT NO. : 6,554,321 B1
DATED : April 29, 2003
INVENTOR(S) : Vincent Boisseau et al.

It is certified that error appears in the above-identified patent and that said Letters Patent is hereby corrected as shown below:

Title page, Item [54] and Column 1, line 2,
Title, "EXAUST" should read -- EXHAUST --.

Title page,
Item [30], Foreign Application Priority Data,
"99 09889" should read -- 99 08998 --.

Column 7,
Line 50, "portions" should read -- portion, --.

Column 8,
Line 24, "coupling" should read -- decoupling --.
Line 44, "claim 17" should read -- claim 1 --.

Signed and Sealed this

Ninth Day of September, 2003

JAMES E. ROGAN
*Director of the United States Patent and Trademark Office*